US012045682B1

(12) United States Patent
Hong (10) Patent No.: US 12,045,682 B1
(45) Date of Patent: Jul. 23, 2024

(54) RADIO-FREQUENCY IDENTIFICATION FITTING RING ASSEMBLY

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 18/448,969

(22) Filed: Aug. 14, 2023

(30) Foreign Application Priority Data

May 3, 2023 (TW) .................................. 112116384

(51) Int. Cl.
*G06K 19/077* (2006.01)
*G06K 19/04* (2006.01)
*G06K 19/07* (2006.01)

(52) U.S. Cl.
CPC ..... *G06K 19/07749* (2013.01); *G06K 19/041* (2013.01); *G06K 19/0723* (2013.01)

(58) Field of Classification Search
CPC ........... G06K 19/07749; G06K 19/041; G06K 19/0723
See application file for complete search history.

(56) References Cited

U.S. PATENT DOCUMENTS

| | | | | |
|---|---|---|---|---|
| 10,037,449 | B1* | 7/2018 | Hahn ................ | G06K 19/0707 |
| 2013/0092739 | A1* | 4/2013 | Huang ............. | G06K 19/07718 |
| | | | | 216/13 |
| 2013/0107042 | A1* | 5/2013 | Forster ............. | G06K 19/07703 |
| | | | | 340/10.6 |
| 2016/0307013 | A1* | 10/2016 | Dagdelen Uysal ......... | G06Q 10/0833 |

(Continued)

FOREIGN PATENT DOCUMENTS

| CA | 3176653 A1 * | 5/2022 | ............ A61M 39/20 |
|---|---|---|---|
| CN | 214226329 U * | 9/2021 | |
| CN | 217982683 U * | 12/2022 | |

(Continued)

OTHER PUBLICATIONS

CN114207340B—Clamp and method for fastening a clamp, 10 pages. (Year: 2024).*

(Continued)

*Primary Examiner* — Tuyen K Vo
(74) *Attorney, Agent, or Firm* — Apex Juris, pllc; Cera Oh (57) ABSTRACT

A radio-frequency identification fitting ring assembly includes a fitting ring having a ring portion and two sheet portions that respectively extend outward from a same side of the ring portion. The sheet portions are clamped to be in contact with each other and respectively have a through hole. A fixing member passes through the through holes and has a first expanded portion and a second expanded portion on two ends of the fixing member, respectively, to restrict the two sheet portions. A radio-frequency identification member is disposed on the first expanded portion. A part of the radio-frequency identification member is exposed out of the first expanded portion. When the present invention is used, the fitting ring fits around a hose clamp for fixing, and the radio-frequency identification member could be read or written by a read/write device for marking or identifying an information related to the hose clamp later.

12 Claims, 7 Drawing Sheets

(56) References Cited

U.S. PATENT DOCUMENTS

2017/0161601 A1* 6/2017 Sevaux ................. G09F 3/0335
2021/0206406 A1* 7/2021 Sato ....................... B60B 37/06

FOREIGN PATENT DOCUMENTS

| CN | 114207340 B | * | 12/2023 | ............... F16L 23/08 |
| DE | 202016100462 U1 | | 2/2016 | |
| DE | 202021103394 U1 | | 9/2022 | |
| EP | 1864939 A1 | * | 12/2007 | ............... B66C 1/12 |
| EP | 3909901 A1 | | 11/2021 | |

OTHER PUBLICATIONS

CN214226329U—Impact-resistant and heat-resistant RFID hanging industrial hanging tag, 4 pages. (Year: 2024).*
CN217982683U—An RFID tag type clothes hangtag, 5 pages. (Year: 2024).*
Search Report for DE102023123908.2, Issued on Feb. 9, 2024, Total of 6 page.
English Abstract for DE202016100462, Total of 1 page.
English Abstract for DE202021103394, Total of 1 page.

* cited by examiner

RADIO-FREQUENCY IDENTIFICATION FITTING RING ASSEMBLY

BACKGROUND OF THE INVENTION

Technical Field

The present invention relates generally to a fitting ring assembly, and more particularly to a radio-frequency identification fitting ring assembly.

Description of Related Art

Nowadays, radio-frequency identification is widely applied to manufacturing ends, asset administrator ends, and user ends. By writing and reading a conventional radio-frequency identification tag, an information could be written on an object that the radio-frequency identification tag is attached to, and the information related to the object could be stored in the radio-frequency identification tag for future use.

In general, the conventional radio-frequency identification tag is a sticker attached to a package of a product or a tag hung on an object. As a result, the conventional radio-frequency identification tag requires a certain area for being attached or easily swings around. When the convention radio-frequency identification tag is used in a liquid pipeline of a hose clamp, the convention radio-frequency identification tag does not meet the requirement of the liquid pipeline that is not suitable for attachment and needs the tag to be stably hung.

BRIEF SUMMARY OF THE INVENTION

In view of the above, the primary objective of the present invention is to provide a fitting ring assembly, which could stably fit around a hose clamp with a fitting ring without being easily detached or randomly swinging around, and an information stored in a radio-frequency identification member could be written or read.

The present invention provides a radio-frequency identification fitting ring assembly including a fitting ring, a fixing member, and a radio-frequency identification member. The fitting ring has a ring portion and two sheet portions respectively extending outward from a same side of the ring portion, wherein a fitting hole is formed on an inside of the ring portion. The two sheet portions are clamped to be in contact with each other and respectively have a through hole. The fixing member passes through the two through holes of the two sheet portions and has a first expanded portion and a second expanded portion. The first expanded portion and the second expanded portion abut against a surface of one of the two sheet portions and a surface of the other sheet portion, respectively. The two surfaces of the two sheet portions are opposite to each other. The radio-frequency identification member is disposed on the first expanded portion, wherein a part of the radio-frequency identification member is exposed out of the first expanded portion.

With the aforementioned design, when the present invention is used, the ring portion of the fitting ring fits around the hose clamp, and the radio-frequency identification member disposed on the first expanded portion of the fixing member could be read or written by a read/write device for marking or identifying the information related to the hose clamp later. As the fixing member could fix the two sheet portions on the same side of the fitting ring and receive the radio-frequency identification member at the same time, the radio-frequency identification fitting ring assembly is compact in size and could not be easily loosened or moved after fitting around the hose clamp, the requirement of the liquid pipeline that needs the radio-frequency identification member to be stably hung for identifying the information of the object could be fulfilled.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A radio-frequency identification fitting ring assembly 100 according to a first embodiment of the invention is illustrated in FIG. 1 to FIG. 6 and includes a fitting ring 10, a fixing member 20 adapted to restrict the fitting ring 10, and a radio-frequency identification member 30 disposed on the fixing member 20 and is adapted to allow an external read/write device to read/write an information stored in the radio-frequency identification member 30.

The fitting ring 10 has a ring portion 12. The ring portion 12 is C-shaped. Two ends on the same side of the ring portion 12 extend outward to form two sheet portions 14, respectively. A fitting hole 121 is formed on an inside of the ring portion 12. The two sheet portions 14 are clamped to be in contact with each other. A part of each of the sheet portions 14 that is not in contact with the other sheet portion 14 has a surface 141. The two surfaces 141 of the two sheet portions 14 face away from each other. Each of the two sheet portions 14 has a through hole 142, wherein the two through holes 142 of the two sheet portions 14 are aligned.

The fixing member 20 passes through the two through holes 142. A first expanded portion 22 and a second expanded portion 24 are respectively provided on two opposite ends of the fixing member 20, respectively. The first expanded portion 22 and the second expanded portion 24 respectively abut against the surface 141 of one of the two sheet portions 14 to restrict the two sheet portions 14 of the fitting ring 10, so that the fitting ring 10 is kept closed and the fitting hole 121 could fit around a hose clamp A for fixing.

The radio-frequency identification member 30 is disposed on the first expanded portion 22 of the fixing member 20, wherein a part of the radio-frequency identification member 30 is exposed out of the first expanded portion 22. The exposed part of the radio-frequency identification member 30 enables the external read/write device to read/write the information stored in the radio-frequency identification member 30.

Referring to FIG. 3 to FIG. 6, when the radio-frequency identification fitting ring assembly 100 is in use, the ring portion 12 of the fitting ring 10 fits around the hose clamp A, so that the hose clamp A penetrates through the fitting hole 121. The hose clamp A is adapted to fasten a hose to a periphery of a pipeline connector. The fixing member 20 is adapted to restrict the two sheet portions 14 of the fitting ring 10 through the first expanded portion 22 and the second expanded portion 24 respectively located on the two opposite ends of the fixing member 20, so that the fitting ring 10 is kept closed, thereby preventing the radio-frequency identification fitting ring assembly 100 from being detached once the radio-frequency identification fitting ring assembly 100 is disposed on the hose clamp A. The radio-frequency identification fitting ring assembly 100 enables the external read/write device to read/write the information stored in the radio-frequency identification member 30 through the radio-frequency identification member 30 disposed on the first expanded portion 22, so that the information related to the hose clamp A could be marked or identified later.

Referring to FIG. 1 to FIG. 5, a top of the first expanded portion 22 has a receiving hole 221. In the first embodiment, the receiving hole 221 is formed by drilling and is a straight hole The radio-frequency identification member 30 includes a main body 32 and an electronic assembly 34. The main body 32 is made of plastic and is cylindrical in shape. The electronic assembly 34 is enclosed in the main body 32 and includes an RFID chip 341.

The main body 32 includes a top section 321, a bottom section 322, and a middle section 323 connected between the top section 321 and the bottom section 322. An outer diameter of the main body 32 gradually increases from a free end surface of the top section 321 to the middle section 323 and from a free end surface of the bottom section 322 to the middle segment 323, so that a middle of an outer peripheral surface of the middle section 323 has a peak portion 324 that is in ring shape. When the main body 32 is disposed in the receiving hole 221, the peak portion 324 of the main body 32 is compressed and deformed to abut against a hole wall of the receiving hole 221, so that the main body 32 could elastically fit in the receiving hole 221 without being easily detached from the receiving hole 221.

The fitting ring 10 is formed by folding a fitting ring body 11 that is a long metallic plate. The fitting ring 10 is fixed by the fixing member 20 restricting the two sheet portions 14 of the fitting ring 10. Two end portions of the fitting ring body 11 are the two sheet portions 14. A recessed section 111 is formed by recessing into a portion of the fitting ring body 11 located between the two sheet portions 14. When the fitting ring body 11 is folded to clamp the two sheet portions 14 to be in contact with each other, the recessed section 111 is correspondingly folded to form the ring portion 12, the ring portion 12 is a flat C-shaped ring, and the fitting hole 121 is a flat through hole.

Two side surfaces 122 are provided on two opposite sides of the ring portion 12, respectively. In the first embodiment, the two side surfaces 122 are parallel, and a shortest distance H1 between the two side surfaces 122 is greater than a shortest distance H2 between the two surfaces 141. Each of the two side surfaces 122 extends to form an extended side surface 123 that is imaginary. Each of the extended side surfaces 123 faces one of the two surfaces 141 that is on the same side. A shortest distance between one of the two extended side surfaces 123 and the corresponding surface 141 is defined as a height difference H3. A height of the second expanded portion 24 protruding from one of the two surfaces 141 that is abutted by the second expanded portion 24 is less than the height difference H3, so that when the fitting ring 10 fits around the hose clamp A, the second expanded portion 24 does not protrude relative to a bottom side of the ring portion 12. Therefore, when the radio-frequency identification fitting ring assembly 100 fits around the hose clamp A through the fitting ring 10, no protruding structure is disposed around the fitting ring 10 that scratches the pipeline connector and the hose restricted by the hose clamp A, and only the side surface 122 on a bottom side of the fitting ring 10 abuts against the hose restricted by the hose clamp A. In this way, the radio-frequency identification member 30 and the fixing member 20 disposed on the two sheet portions 14, which are located on a side of the ring portion 12, would not be flipped over by any protruding structure at a bottom of the ring portion 12, so that a top surface of the radio-frequency identification member 30 is substantially parallel to a surface of the hose clamp A, thereby being conducive to reading the electronic assembly 34 in the radio-frequency identification member 30.

The fixing member 20 has a neck portion 26. Referring to FIG. 2 to FIG. 5, when the fitting ring body 11 is folded to form the ring portion 12 and is not restricted by the fixing member 20 for fixing, the fixing member 20 penetrates through the two through holes 142 via the neck portion 26, and the first expanded portion 22 connected to an end of the neck portion 26 abuts against one of the two surfaces 141. Then, the two sheet portions 14 are riveted by the fixing member 20, so that another end of the neck portion 26 forms the second expanded portion 24; in other words, the second expanded portion 24 is formed on the another end of the neck portion 26 by riveting. In this way, two opposite ends of the neck portion 26 are connected to the first expanded portion 22 and the second expanded portion 24, respectively, and are adapted to restrict the two surfaces 141 of the two sheet portions 14 that are opposite to each other, thereby keeping the fitting ring 10 closed without being opened. In the current embodiment, an outer diameter of the first expanded portion 22 is greater than an outer diameter of the second expanded portion 24, and a height of the first expanded portion 22 protruding from one of the two surfaces 141 that is abutted by the first expanded portion 22 is greater than the height of the second expanded portion 24 protruding from the other surface 141 that is abutted by the second expanded portion 24.

Figure 1:
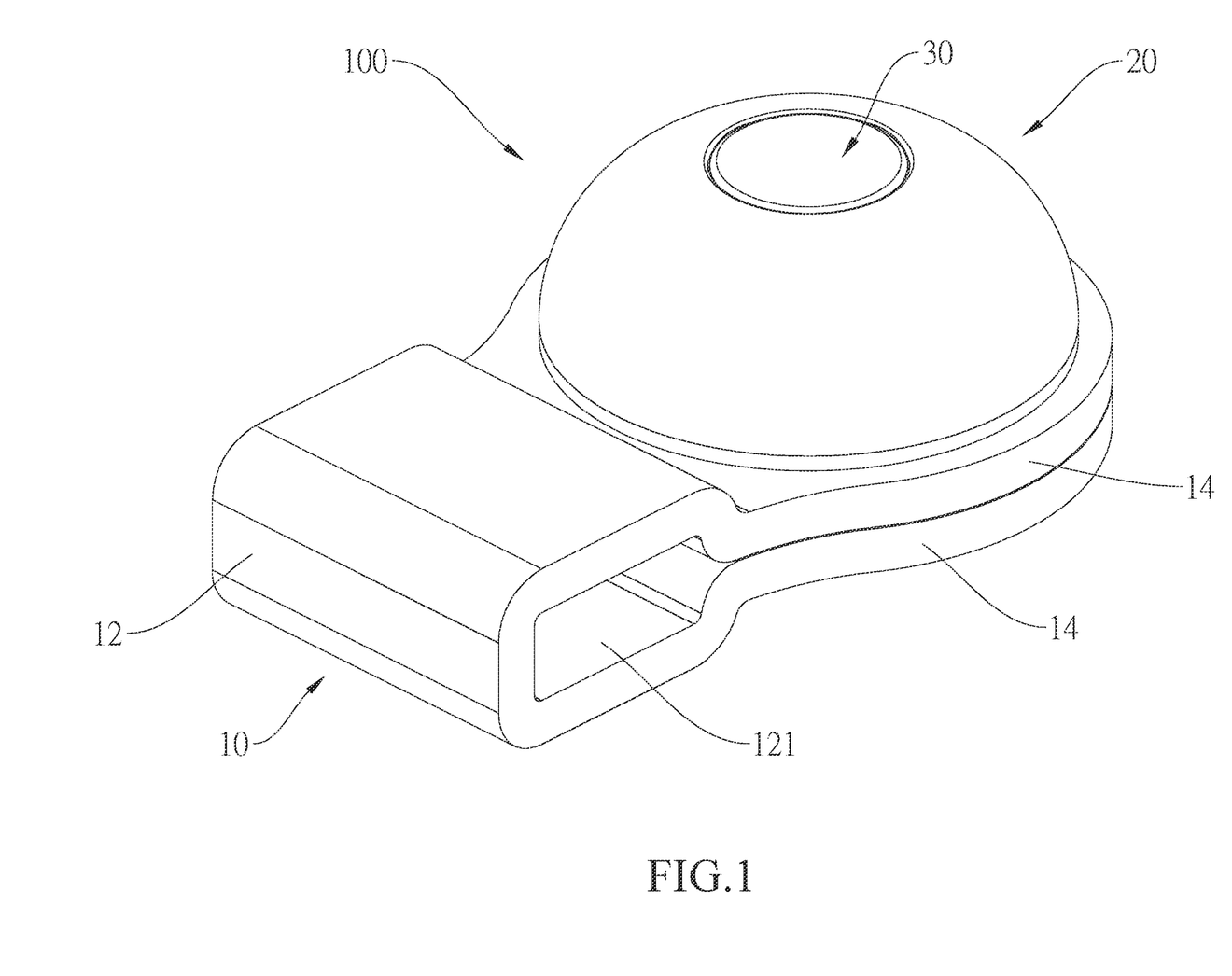
FIG. 1 is a perspective view of the radio-frequency identification fitting ring assembly according to a first embodiment of the invention.
Figure 2:
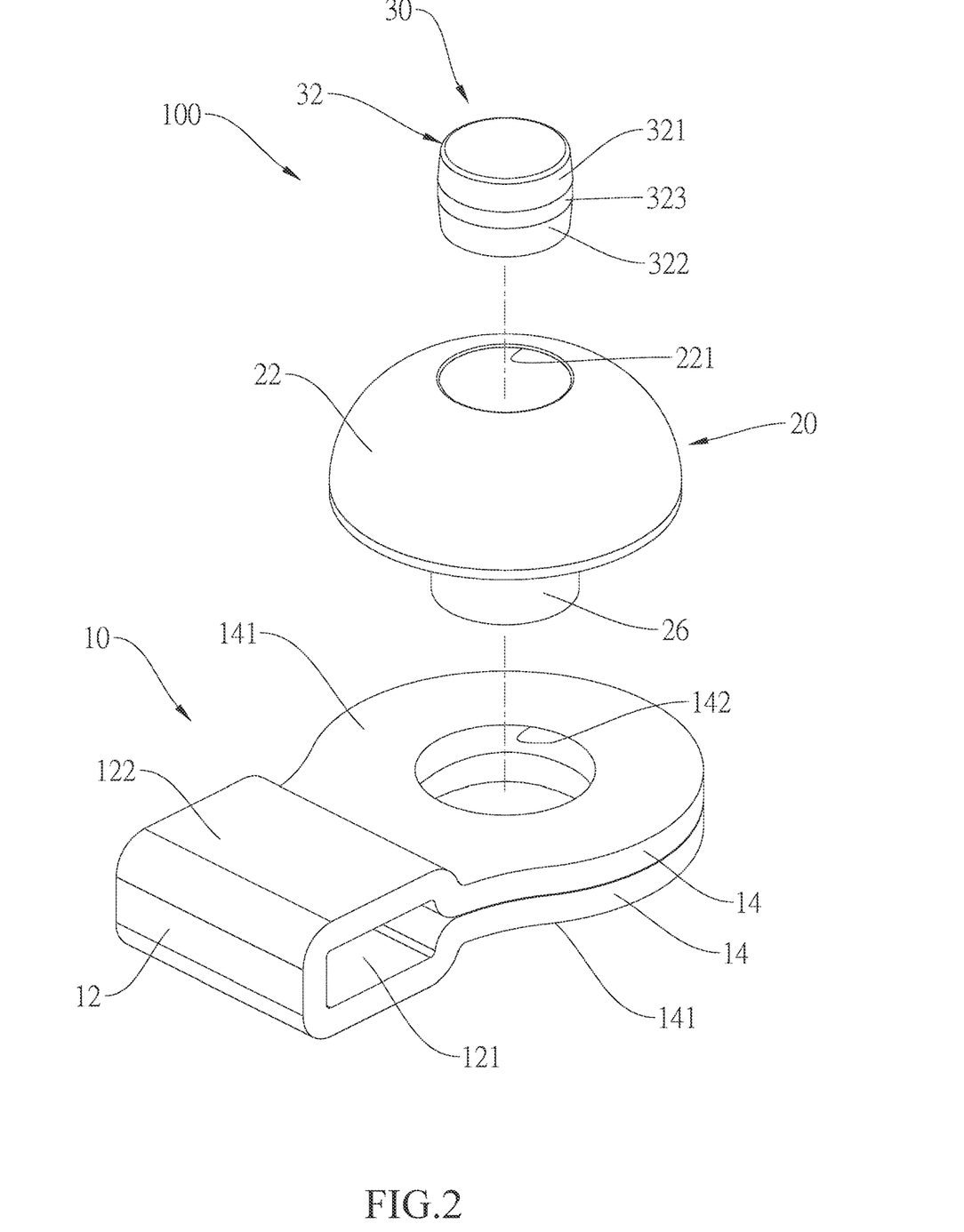
FIG. 2 is an exploded view of the radio-frequency identification fitting ring assembly according to the first embodiment of the invention.
Figure 3:
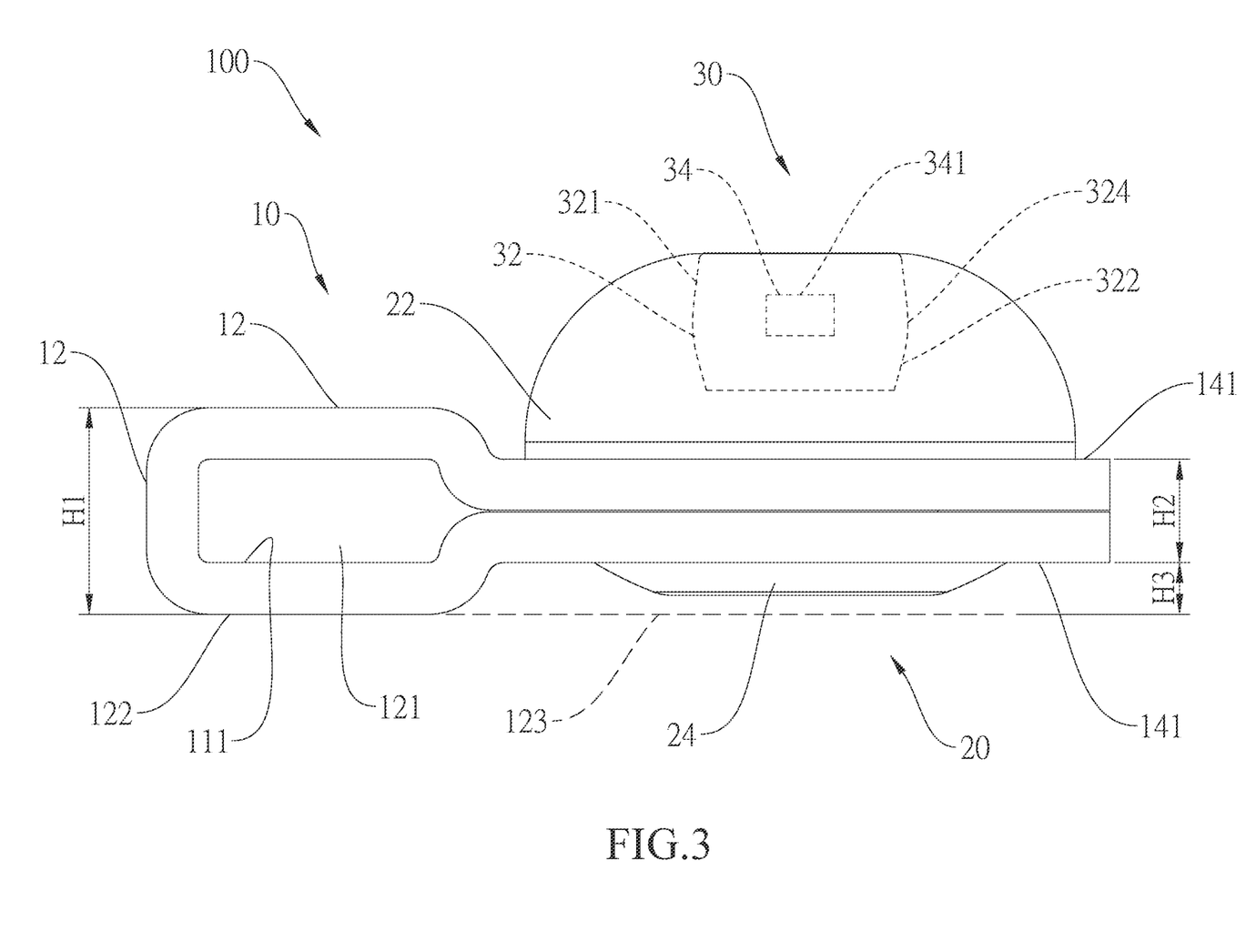
FIG. 3 is a right side view of FIG. 1.
Figure 4:
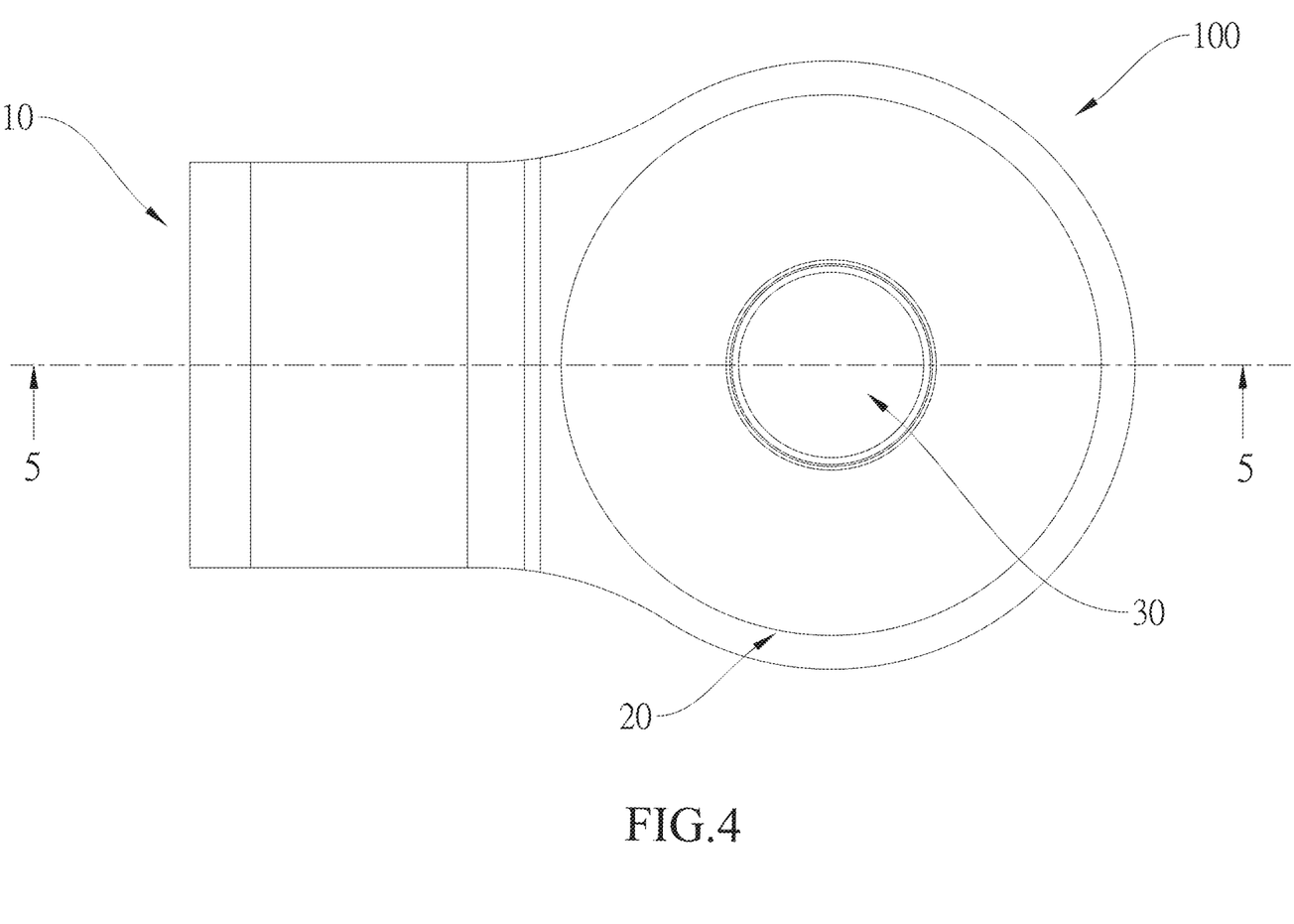
FIG. 4 is a top view of FIG. 1.
Figure 5:
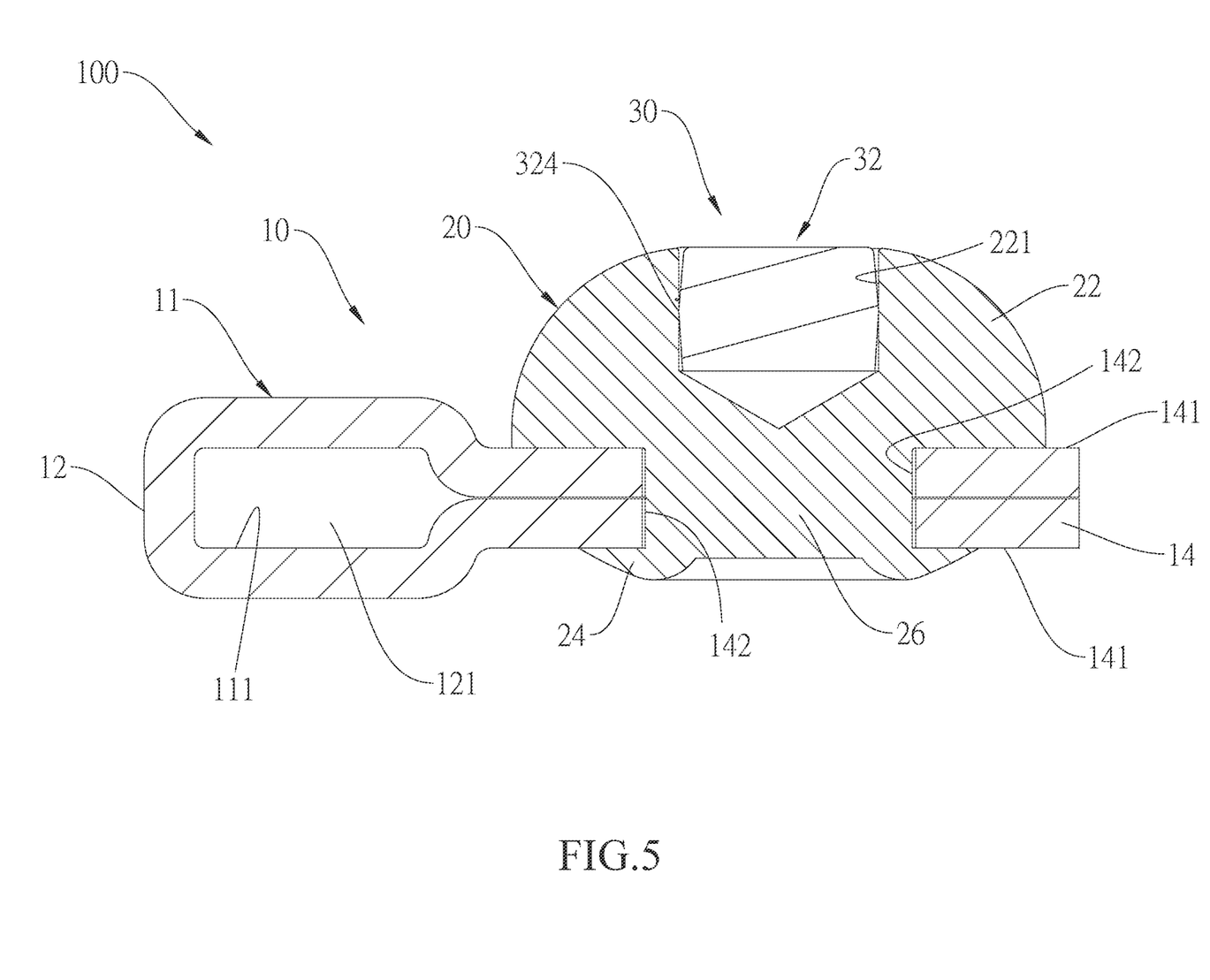
FIG. 5 is a sectional view along the 5-5 line in FIG. 4.
Figure 6:
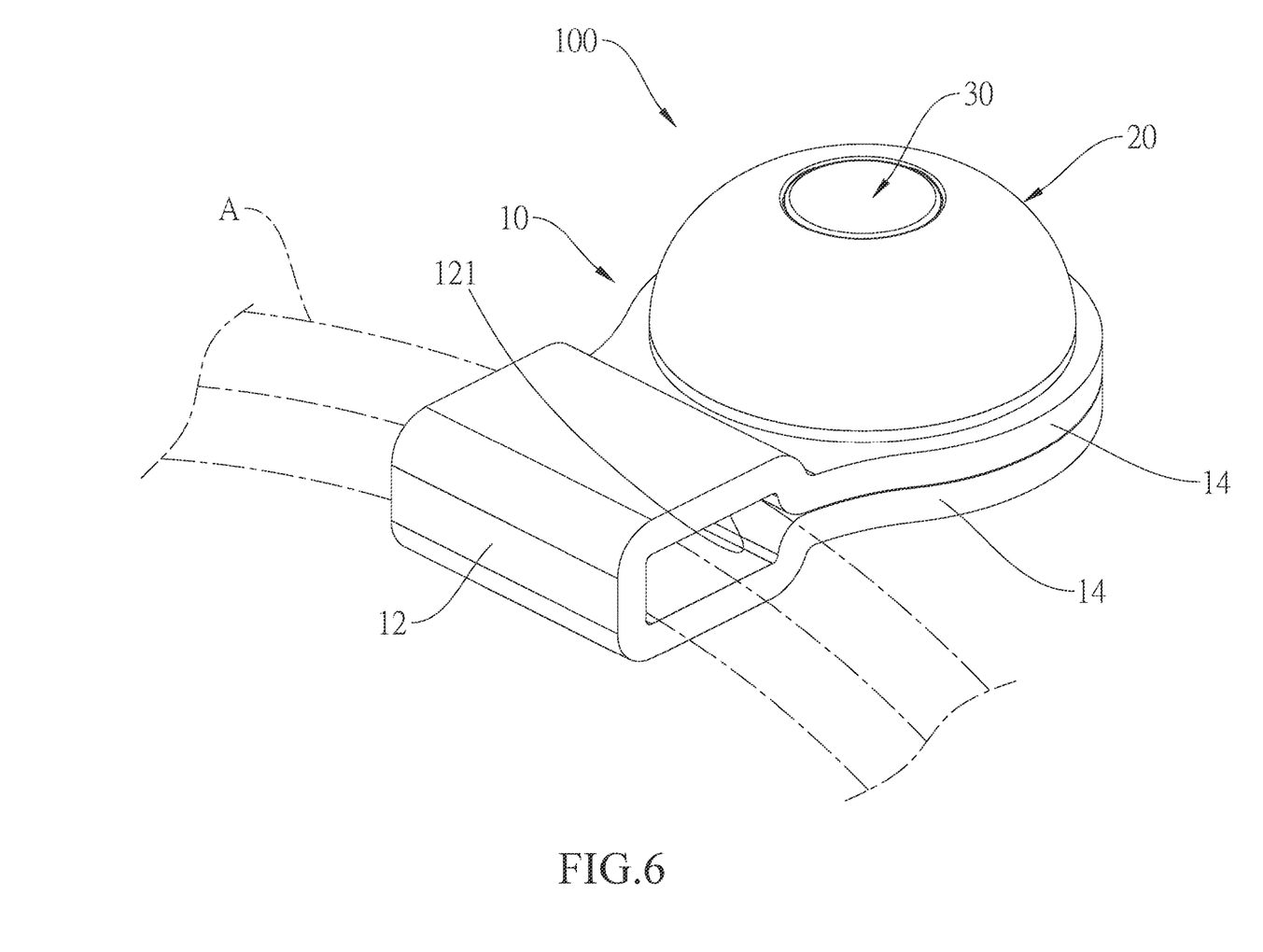
FIG. 6 is a schematic view, showing the radio-frequency identification fitting ring assembly being disposed on the hose clamp according to the first embodiment of the invention.
Figure 7:
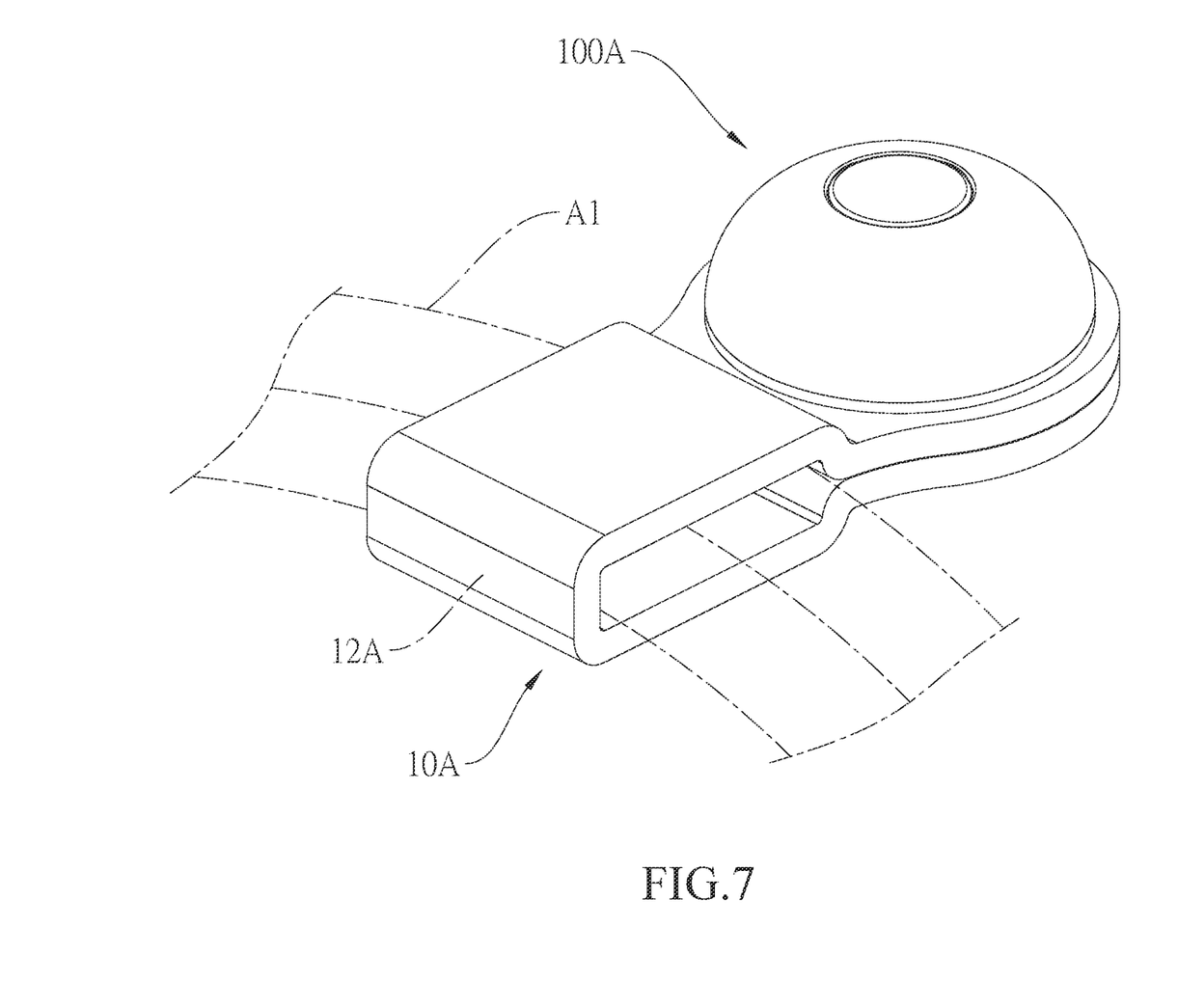
FIG. 7 is a schematic view, showing the radio-frequency identification fitting ring assembly being disposed on the another hose clamp according to a second embodiment of the invention.

Apart from the first embodiment, in which the fitting ring 10 fits around the hose clamp A having a small width through the ring portion 12, a radio-frequency identification fitting ring assembly 100A according to a second embodiment of the present invention is illustrated in FIG. 7, which has almost the same structure as the radio-frequency identification fitting ring assembly 100 in the first embodiment, except that a ring portion 12A of a fitting ring 10A in the second embodiment has a length greater than that of the ring portion 12 of the fitting ring 10 in the first embodiment, so that the fitting ring 10A could fit around another hose clamp A1 having a large width for fixing, and hence the radio-frequency identification fitting ring assembly 100A of the present invention is suitable for different hose clamps having different widths and sizes. The After the ring portion 12A of the fitting ring 10A fits around the another hose clamp A1, the radio-frequency identification fitting ring assembly 100A of the present invention could not be easily loosened or moved because of an inner wall of the ring portion 12A tightly abutting against a surface of the another hose clamp A1.

It must be pointed out that the embodiments described above are only some preferred embodiments of the present invention. All equivalent structures which employ the concepts disclosed in this specification and the appended claims should fall within the scope of the present invention.

What is claimed is:

1. A radio-frequency identification fitting ring assembly, comprising:
   a fitting ring having a ring portion and two sheet portions respectively extending outward from a same side of the ring portion, wherein a fitting hole is formed on an inside of the ring portion; the two sheet portions are clamped to be in contact with each other and respectively have a through hole;
   a fixing member passing through the two through holes of the two sheet portions and having a first expanded portion and a second expanded portion, wherein the first expanded portion and the second expanded portion abut against a surface of one of the two sheet portions and a surface of the other sheet portion, respectively; the two surfaces of the two sheet portions are opposite to each other; and
   a radio-frequency identification member disposed on the first expanded portion, wherein a part of the radio-frequency identification member is exposed out of the first expanded portion.

2. The radio-frequency identification fitting ring assembly as claimed in claim 1, wherein the radio-frequency identification member comprises a main body and an electronic assembly; the main body is made of plastic; the electronic assembly is enclosed in the main body and comprises an RFID chip.

3. The radio-frequency identification fitting ring assembly as claimed in claim 2, wherein the first expanded portion has a receiving hole; the main body has a top section, a bottom section and a middle section connected between the top section and the bottom section; an outer diameter of the main body gradually increases from a free end surface of the top section to the middle section and from a free end surface of the bottom section to the middle section; a middle of an outer peripheral surface of the middle section has a peak portion that is in ring shape; when the main body is disposed in the receiving hole, the peak portion is compressed and deformed to abut against an hole wall of the receiving hole.

4. The radio-frequency identification fitting ring assembly as claimed in claim 1, wherein the fixing member has a neck portion; the neck portion penetrates through the two through holes of the two sheet portions, wherein two opposite ends of the neck portion are connected to the first expanded portion and the second expanded portion, respectively; an outer diameter of the first expanded portion is greater than an outer diameter of the second expanded portion; a height of the first expanded portion protruding from the surface of one of the two sheet portions that is abutted by the first expanded portion is greater than a height of the second expanded portion protruding from the surface of the other sheet portion that is abutted by the second expanded portion.

5. The radio-frequency identification fitting ring assembly as claimed in claim 4, wherein the second expanded portion is disk-shaped and is formed by an end of the neck portion through riveting.

6. The radio-frequency identification fitting ring assembly as claimed in claim 4, wherein the fitting ring is formed by folding a fitting ring body; the fitting ring is a long metallic plate; two end portions of the fitting ring body are the two sheet portions; a recessed section is formed by recessing into a portion of the fitting ring body located between the two sheet portions; the fitting ring body is folded to clamp the two sheet portions to be in contact with each other, and the recessed section forms the ring portion.

7. The radio-frequency identification fitting ring assembly as claimed in claim 1, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; a height of the second expanded portion protruding from one of the two surfaces that is abutted by the second expanded portion is less than the height difference.

8. The radio-frequency identification fitting ring assembly as claimed in claim 2, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; a height of the second expanded portion protruding from one of the two surfaces that is abutted by the second expanded portion is less than the height difference.

9. The radio-frequency identification fitting ring assembly as claimed in claim 3, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; a height of the second expanded portion protruding from one of the two surfaces that is abutted by the second expanded portion is less than the height difference.

10. The radio-frequency identification fitting ring assembly as claimed in claim 4, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; the height of the second expanded portion protruding from one of the two surfaces that is abutted by the second expanded portion is less than the height difference.

11. The radio-frequency identification fitting ring assembly as claimed in claim 5, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; the height of the second expanded portion protruding from one of the two surfaces that is abutted by the second expanded portion is less than the height difference.

12. The radio-frequency identification fitting ring assembly as claimed in claim 6, wherein the ring portion is a flat C-shaped ring; two side surfaces are provided on two opposite sides of the ring portion, respectively; a shortest distance between the two side surfaces is greater than a shortest distance between the two surfaces of the two sheet portions; each of the two side surfaces extends to form an extended side surface that is imaginary, wherein each of the two extended side surfaces faces one of the two surfaces of the two sheet portions that is on the same side; a shortest distance between one of the two extended side surfaces and the corresponding surface is defined as a height difference; the height of the second expanded portion protruding from one of the two surfaces that is abutted by the second expanded portion is less than the height difference.

\* \* \* \* \*